United States Patent [19]

Schiff

[11] Patent Number: 4,745,474

[45] Date of Patent: May 17, 1988

[54] TWO RESOLUTION LEVEL DPCM SYSTEM

[75] Inventor: Leonard N. Schiff, Lawrenceville, N.J.

[73] Assignee: General Electric Company, Schenectady, N.Y.

[21] Appl. No.: 40,470

[22] Filed: Apr. 17, 1987

[51] Int. Cl.[4] .................. H04N 7/13

[52] U.S. Cl. .................. 358/133; 358/105; 358/136; 375/27

[58] Field of Search .................. 358/105, 133, 135, 136, 358/138; 375/27, 31, 33

[56] References Cited

U.S. PATENT DOCUMENTS

| | | | |
|---|---|---|---|
| 3,761,613 | 9/1973 | Limb | 358/136 |
| 3,769,451 | 10/1973 | Connor | 358/135 |
| 3,801,737 | 4/1974 | Komura | 358/135 |
| 4,006,297 | 2/1977 | Koga | 358/136 |
| 4,470,146 | 9/1984 | Yatsuzuka et al. | 375/30 |
| 4,541,102 | 9/1985 | Grallert | 375/30 |
| 4,551,753 | 11/1985 | Nishizawa et al. | 358/140 |
| 4,562,468 | 12/1985 | Koga | 358/136 |
| 4,583,114 | 4/1986 | Catros | 358/13 |
| 4,598,411 | 7/1986 | Berkovich | 358/136 |
| 4,603,347 | 7/1986 | Kuroda et al. | 358/13 |
| 4,620,225 | 10/1986 | Wendland | 358/105 |
| 4,672,441 | 6/1987 | Hoelzlwimmer | 358/135 |
| 4,682,225 | 7/1987 | Graham | 358/133 |

*Primary Examiner*—Howard W. Britton
*Attorney, Agent, or Firm*—Joseph S. Tripoli; Henry I. Steckler; Fred Jacob

[57] ABSTRACT

A digital television transmitter has a buffer that receives a low resolution low pass filtered signal. A high resolution high pass filtered signal is applied to the buffer only when the buffer can accept it without overflowing. A digital television receiver receives a digital television picture signal and preferably a transmitter buffer occupancy state signal. A low resolution low pass filtered signal is applied to an adder. A high resolution high pass filtered signal is applied to the adder when the buffer state is low and also when it is intermediate and no substantial motion is present. The transmitter and receiver are useful in video teleconferencing.

22 Claims, 3 Drawing Sheets

TWO RESOLUTION LEVEL DPCM SYSTEM

BACKGROUND OF THE INVENTION

The present invention relates to a DPCM (differential pulse code modulation) system. DPCM systems are useful in applications such as video teleconferencing via satellite.

There is interest in using satellites to provide reliable video teleconferencing services using digital data transmission. However, due to power and bandwidth limitations of the satellite, it is important that the data rate be minimized consistent with acceptable picture quality. One way is to use DPCM wherein data is transmitted only when changes occur in the picture, e.g., from a pixel in a frame to a corresponding pixel in the next frame or one pixel in a line to a succeeding one in the same line. However, while it is especially important when using a satellite transmission channel, it is always desired to reduce the data rate to as low a value as possible regardless of the transmission channel used, i.e., satellite or terrestrial.

Even with typically low data rates produced by a DPCM system, a transmitter output buffer can be overloaded by the input data when there is a large amount of motion in the picture. The buffer can provide a signal indicating that it is at or near capacity and this signal can be used to reduce the input data rate by reducing the number of quantizing levels and/or the number of samples. However, such a system degrades the picture resolution not only in picture areas having motion, where the degradation is acceptable since the resolution of the human eye degrades with increased motion, but also degrades resolution in stationary picture areas, where it may not be acceptable.

SUMMARY OF THE INVENTION

Apparatus for transmitting a digital television picture signal comprises a buffer having an output means for providing said digital television picture signal, means for providing first data to said buffer representing a low resolution low pass filtered version of said picture, and means for providing second data to said buffer only when said buffer can accept said second data without overflowing, said second data representing a high pass filtered high resolution version of said picture.

Apparatus for receiving a digital television picture signal comprises a first inverse digital pulse code modulation loop for receiving first data representing a low resolution low pass filtered version of said picture, a second inverse digital pulse code modulation loop for receiving second data representing a high resolution high pass filtered version of said picture, and an adder coupled to said loops.

DETAILED DESCRIPTION OF THE PREFERRED EMBODIMENTS

Figure 1:
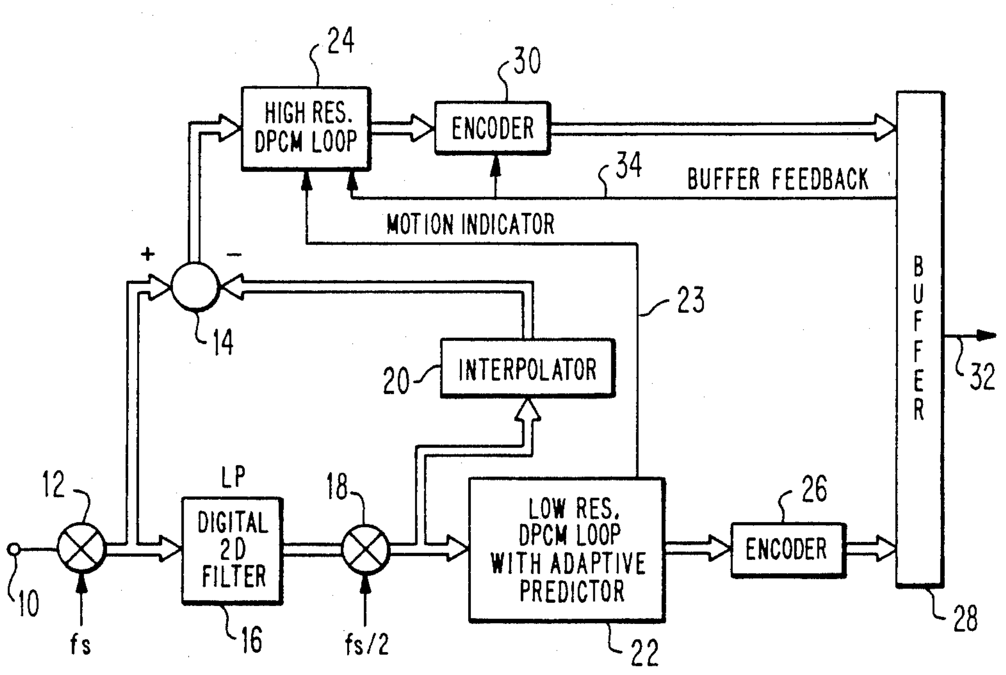
FIG. 1 is a block diagram of a transmitter in accordance with the invention.

In FIG. 1 there is shown an input 10 that receives an analog video signal, such as a luminance or chrominance component (or other signal components descriptive of a color video or monochrome image), typically having a bandwidth of about 2 MHz, which is applied to a digitizer (sampler followed by an analog to digital converter) 12 that also receives a sampling signal $f_s$, typically about 4.4 MHz. The output signal from the digitizer 12, which has the intended resolution at the receiver and typically comprises 8 parallel bits, is applied to a subtractor 14 and also to a two dimensional finite impulse response low pass filter (LPF) 16, such as two shift registers (one for each dimension, each having weighted taps), to prevent aliasing when decimated (described below). The output signal from the LPF 16 is applied to a subsampler 18 that receives a sampling signal at $f_s/2$ (other subsampling ratios are possible) that subsamples by 2:1 in each direction to provide a four times decimated signal. The result is a low spatial resolution signal that is applied to an interpolator 20 and also to a low resolution DPCM loop 22 with an adaptive predictor (described in detail below). The adaptive DPCM loop 22 provides a motion indicator signal on a line 23 that indicates whether or not there is substantial motion in the picture to a high resolution DPCM loop 24 (described in detail below) and a low resolution video signal to a Huffman and run-length encoder 26 which can be implemented in the form of a read only memory (ROM) look up table. The encoder 26 provides first data representing a low resolution low pass filtered video signal to a buffer 28 which can be in the form of a memory.

The output signal from the interpolater 20 has four times the number of pixels as its input signal (twice in each direction) and thus is an oversampled low resolution or low pass filtered signal. This signal is subtracted from the original high resolution signal by the subtractor 14 resulting in a high resolution high pass filtered signal that is applied to the DPCM loop 24. The output signal from the DPCM loop 24 is applied to a Huffman and run-length encoder 30 identical to the encoder 26, while the encoder 30 usually supplies a second data signal representing a high pass filtered picture to the buffer 28.

In turn, the buffer 28 stores many frames of compressed digital video, typically one quarter to one half second worth, and then provides a constant data rate output signal on a line 32 that normally is used to modulate a radio frequency (RF) carrier signal or is provided to a baseband data channel. A buffer feedback signal is provided on a line 34 to the DPCM loop 24 and to the encoder 30. This feedback signal represents three occupancy states of the buffer 28, namely high, intermediate, and low, respectively, and can be generated by deriving the difference between a fill pointer (not shown) and an empty pointer (not shown) located within the buffer 28. Whenever the buffer 28 changes occupancy state, this fact is signalled on the line 32 by transmission of a code word unique to the particular new state, typically at the beginning of a scan line. Further, synchronization and audio signals are present on the line 32 by multiplexing means all as known in the art.

In operation, when the buffer 28 occupancy is low, the DCPM loop 24 operates in a normal mode regardless of the motion indicator signal, and thus the buffer 28 receives and transmits a low resolution low pass filtered signal from the encoder 26 and a high resolution high pass filtered signal from the encoder 30.

When the buffer 28 occupancy is high, e.g., almost full, the output signal from the encoder 30 is ignored by the buffer 28, while the low resolution output signal from the encoder 26 is applied to the buffer 28. Since this signal contains only one quarter of the number of pixels of a high resolution signal, this allows the buffer 28 to avoid an overflow condition.

When the buffer 28 occupancy is intermediate or between said high and low occupancy, and when the motion indicator signal on the line 23 indicates there is little or no motion, i.e., no substantial motion, then the DPCM loop 24 provides a high resolution high pass filtered signal to the encoder 30, which in turn provides such a signal as encoded to the buffer 28. This is a very small data load. The signal from the encoder 26 is also applied to the buffer 28.

When the buffer 28 occupancy is intermediate, and when the motion indicator signal on the line 23 indicates that there is substantial motion present, the DCPM loop 24 provides zeroes to the encoder 30. Therefore the buffer 28 receives a low resolution signal from the encoder 26 and a low amount of data from the encoder 30, thereby allowing it to avoid overflow. This is interpreted differently at the receiver (described below) from the situation of intermediate occupancy and no substantial motion.

In summary, the second data comprising the high resolution high pass filtered version of the picture is applied to the buffer 28 only when the buffer 28 can accept it, i.e., the second data will not cause an overflow of the buffer 28.

In the intermediate occupancy state on the typical scan line, there might be a long string of pixels that represent no substantial motion followed by a long string that represent substantial motion. The DCPM loop 24 will put out a long string of zeroes for the first string since the difference signal is essentially zero followed mostly by a long string of zeroes for the second string since there is substantial motion. Only a few pixels on the boundary between the strings of the scan line having motion and no motion, respectively, will be coded to non-zero values. This allows for very efficient coding by the encoder 30.

Figure 2:
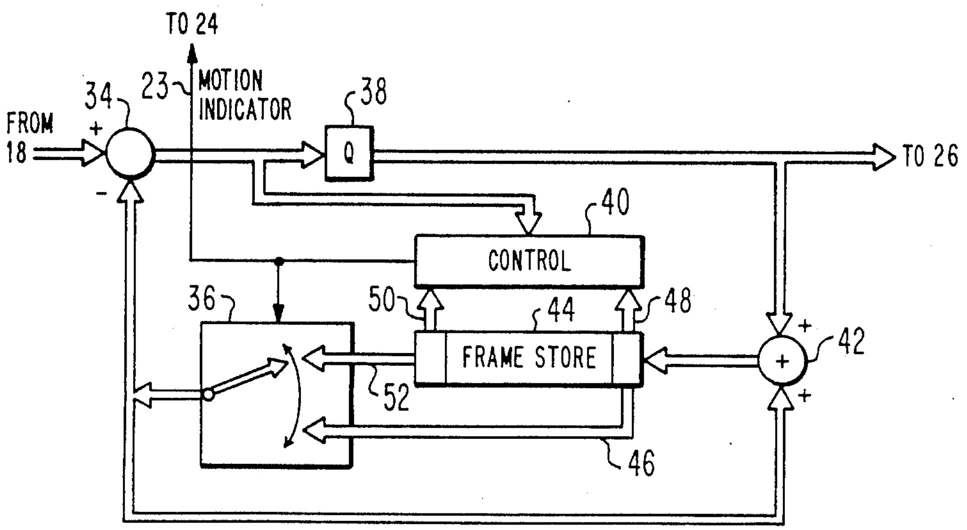
FIG. 2 is a block diagram of a low resolution DPCM loop used in FIG. 1.

FIG. 2 shown the details of the low resolution adaptive predictor DPCM loop 22 wherein a subtractor 34 receives the signal from the subsampler 18 of FIG. 1 and a predicted signal from a switch 36 and applies the resulting difference signal to a coarse quantizer 38, such as a ROM look up table, in order to reduce the data rate, and also to a control circuit 40. The output of the quantizer 38 is applied to the encoder 26 of FIG. 1 and also to an adder 42, which also receives the predicted signal from the switch 36. The resulting sum signal is applied to a frame store 44, which has one pixel delay outputs 46 and 48 applying signals to the switch 36 and the control circuit 40, respectively, and one frame delay outputs 50 and 52 coupled to the control circuit 40 and the switch 36, respectively. Thus the predicted signal is either the value of the corresponding pixel in the previous frame or the pixel value of the immediately preceding pixel in the same line. The selection is made by the control circuit 40, which selects which predicted signal to use based on the last pixel processed coming from the subtractor 34. For each pixel it looks at both predicted signal values, the difference values between the predicted signals and the last signal using subtractors (not shown), and which predicted signal produced the lowest error using a digital comparator (not shown) having inputs coupled to the subtractor outputs, respectively, and that predicted signal will be used for the next pixel by appropriate setting of the switch 36. The predicted state is therefore binary one for high motion (previous pixel on scan line used) or binary zero for no or little motion (pixel in the last frame used). The motion indicating signal is also supplied on the line 23 to the DPCM loop 24 of FIG. 1 by the control circuit 40. The zero for "little motion" can be obtained by using a threshold circuit (not shown) coupled to the comparator output.

Figure 3:
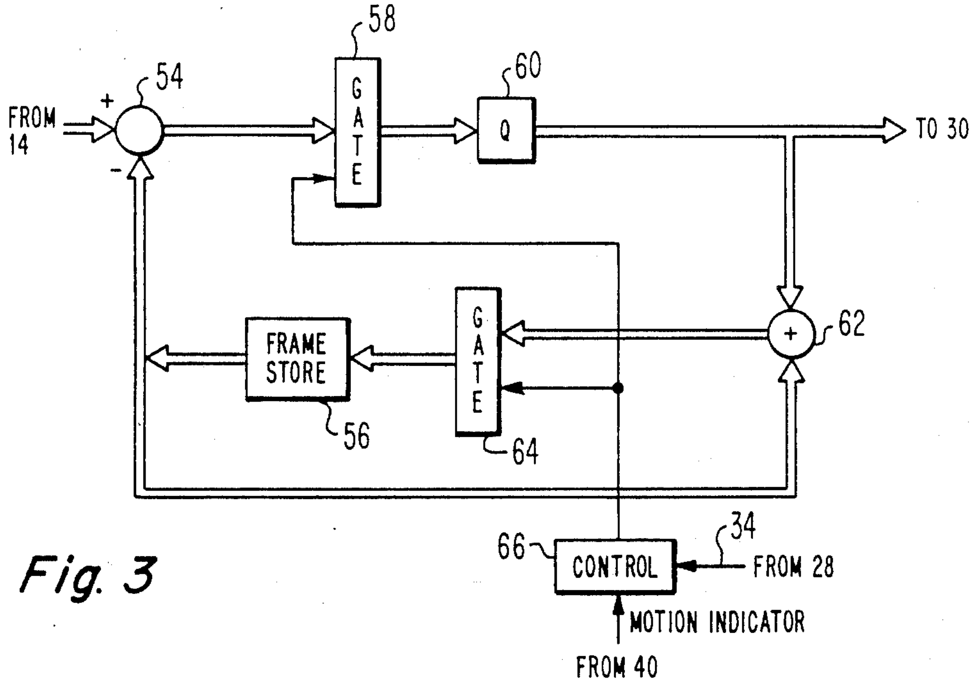
FIG. 3 is a block diagram of a high resolution DPCM loop used in FIG. 1.

FIG. 3 shows details of the DPCM loop 24 of FIG. 1. The high pass filtered high resolution signal from the subtractor 14 of FIG. 1 is applied to a subtractor 54 as is a predicted signal from a frame store 56. The resulting difference signal is applied to a gate 58 and then to a coarse quantizer 60. The output signal from the quantizer 60 is applied to the encoder 30 of FIG. 1 and to an adder 62. The adder 62 also receives the predicted signal from the frame store 56 and the resulting sum signal is applied to a gate 64, which provides a signal to the frame store 56. A control circuit 66 receives a signal from the control circuit 40 of FIG. 2 and the buffer feedback signal on the line 34 from the buffer 28 of FIG. 1.

The gates 58 and 64 can each comprise, e.g., a multibit inhibit gate (not shown) such that when the output signal from the control circuit 66 is high or one, then the gates 64 and 58 provide output signals that are zeroes, and if the output signal from the control circuit 66 is low or zero, then the gates 64 and 58 pass the input signal. The control circuit 66 provides a one when the buffer 28 occupancy state is low, and a zero when the state is high. Further when the state is intermediate, the control circuit 66 provides a zero when the motion indicator is high and a one when it is low.

In operation, when the buffer feedback signal indicates that the buffer 28 occupancy is low, an output signal from the control circuit 66 is low regardless of the state of the motion indicator signal. This causes the gates 58 and 64 to pass digital signals and thus the DPCM loop 24 provides a high pass filtered high resolution signal to the encoder 30. When the buffer 28 occupancy is high, the frame store 56 and the quantizer 60 will receive zeroes from the gates 64 and 58, respectively. However, the data provided by the quantizer 60 to the encoder 30 and from there to the buffer 28 is ignored since the unique code word has been sent to the receiver indicating that no high resolution information will be sent. When the buffer 28 occupancy is intermediate said high and low states and the motion indicator signal is low, the output signal from the control circuit 66 is low and thus the loop 24 works normally, i.e., provides a high resolution signal. When the buffer 28 has intermediate occupancy and the motion indicator signal is high, the control circuit 66 output signal will be high, and thus the gates 58 and 64 will provide zeroes. In turn, the loop 24 will provide zeroes.

Figure 4:
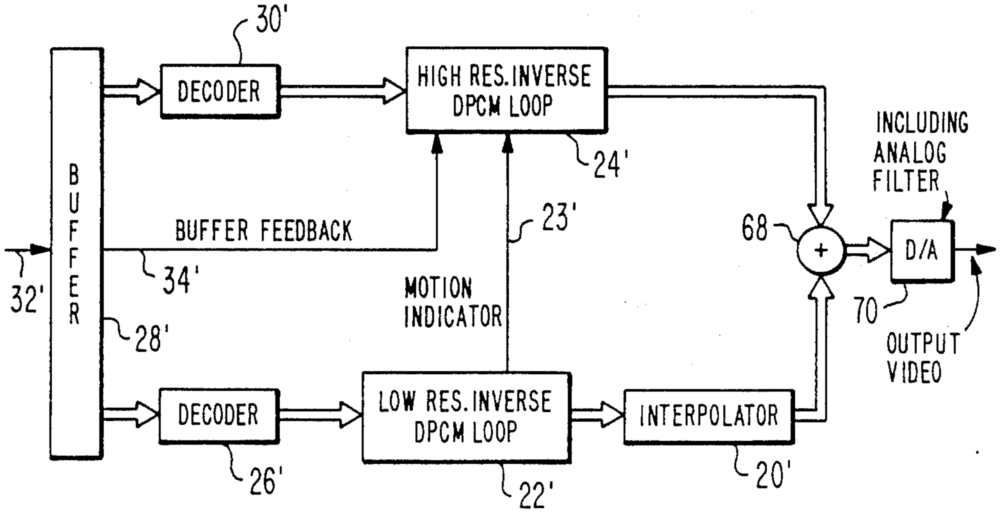
FIG. 4 is a block diagram of a receiver in accordance with the invention.
Figure 5:
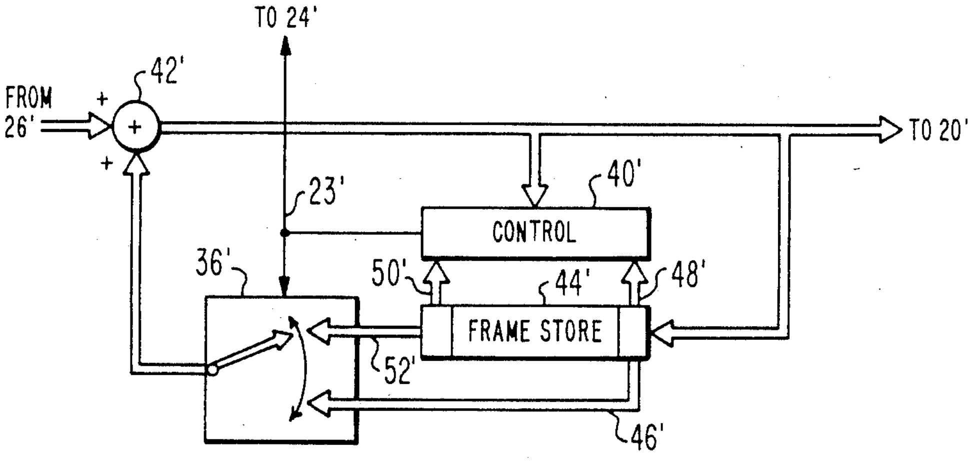
FIG. 5 is a block diagram of a low resolution inverse DPCM loop used in FIG. 4.
Figure 6:
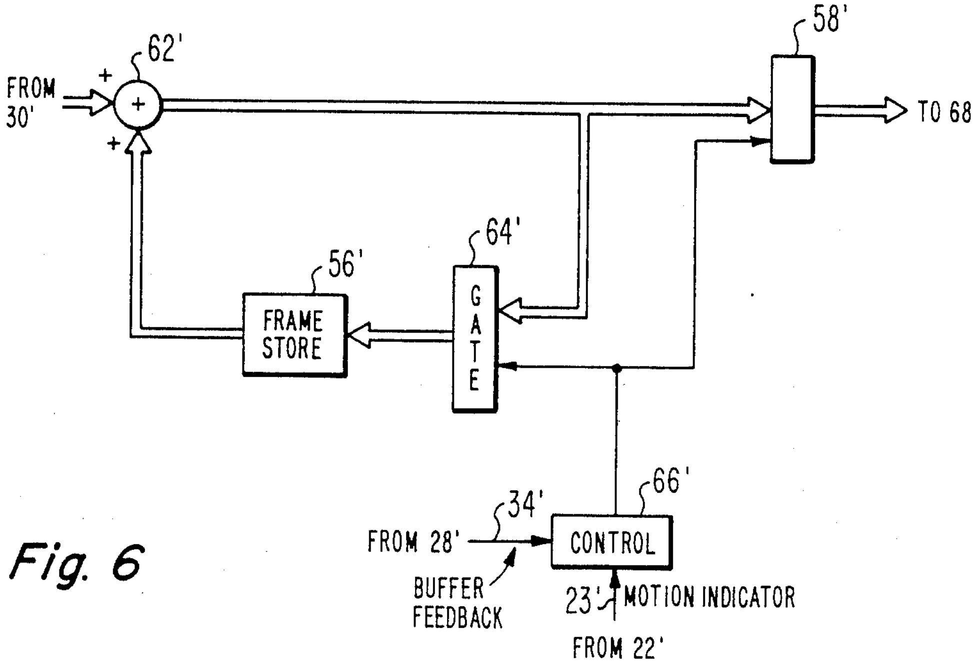
FIG. 6 is a block diagram of a high resolution inverse DPCM loop used in FIG. 4.

In FIGS. 4, 5, and 6 blocks that correspond to blocks of FIGS. 1, 2, and 3, respectively, are designated with the same numerals with primes added.

In FIG. 4 the data signal on the line 32 of FIG. 1 is present on a line 32′ after being received and demodulated, if necessary, and is applied to a buffer 28'. The low resolution low pass filtered data signal is applied to a Huffman and run length decoder 26', such as a ROM, and then to a low resolution inverse adaptive DPCM loop 22'. The output signal from the loop 22' is applied to an interpolator 20', such as a circuit for doubling the number of pixels in each dimension to convert it into an oversampled low resolution signal, and then to an adder 68. The high pas filtered high resolution data signal is applied to a Huffman and run length deooder 30' and then to a high resolution inverse DPCM loop 24', which also receives a buffer feedback signal from the buffer 28' on a line 34' and a motion indicator signal from the loop 22' on a line 23'. The output signal from the loop 24' is applied to the adder 68, which applies its output signal to a digital to analog converter 70 including an LPF, typically having a cutoff frequency of 2 MHz.

In FIG. 5, the data from the decoder 26' is applied to an adder 42' along with a predicted signal from a switch 36'. The output signal from the adder 42' is applied to a control circuit 40', a frame store 44', and also to the interpolator 20' of FIG. 4. The frame store 44' provides a one pixel delay signal to the control circuit 40' over a line 48' and to the switch 36' over a line 46' and a one frame delayed signal to the control circuit 40' over a line 50' and to the switch 36' over a line 52'.

In FIG. 6 the data signal from the decoder 30' of FIG. 4 is applied to an adder 62' as is a predicted signal from a frame store 56'. The output signal from the adder 62' is applied to gates 64' and 58' (identical to the gates 64 and 58 of FIG. 3). The motion indicator signal on the line 23' and the buffer feedback signal on the line 34' are applied to a control circuit 66' (identical to the control circuit 66) having an output signal applied to gates 58' and 64'. The output signal from the gate 64' is applied to the frame store 56', while the output signal from the gate 58' is applied to the adder 68 of FIG. 4. It is noted that the buffer feedback signal represents the state of the transmitter buffer 28 by receiving and decoding unique code words.

The operation of the receiver is just the inverse of the transmitter and thus will not be described in detail. Briefly, when the transmitter buffer 28 has low occupancy, this is signalled by a unique code word and the receiver buffer 28' decodes this using a decoder disposed therein and sets to that state so that both of the loops 22' and 24' are working. Therefore a signal representing a high resolution composite digital picture is formed by the adder 68 and converted to an analog signal by the converter 70. When the buffer 28 has a high occupancy, another unique code word that indicates this will cause the control circuit 66' to in turn cause that zeroes are provided by the loop 24', and thus only a low resolution picture is available at the output of the adder 68. Further, since the frame stores 56 and 56' both have zeroes stored therein, when the low occupancy mode resumes, they are starting from the same value. When the transmitter buffer 28 has an intermediate occupancy, it also signals this to receiver using a third unique code word, which signal is decoded. The control circuit 66' will therefore allow the DPCM loop 24' to work normally on the stationary, i.e., no substantial motion, part of the image and provide zero arithmetic values in the substantially moving areas where appropriate to match the action at the transmitter. The resultant image in the intermediate occupancy state is high resolution for the stationary parts of the picture and low resolution for moving parts of the picture, exactly what is desired.

Further, consider the data rate for a picture that has motion in a large part of it but not all of it. In the low occupancy state, the loop 24' provides a very high data rate. In the intermediate occupancy state, the data rate is much lower because stationary areas result in long zero run-lengths and also moving areas result in long zero run-lengths. In the high occupancy state, the data rate is even lower because only the low resolution data is transmitted.

It will be appreciated that many other embodiments are possibly within the spirit and scope of the invention. In particular, the loops 24 and 24' can use adaptive prediction as do the loops 22 and 22' to further reduce the data rate, especially in the intermediate occupancy state. Also the motion indication signal can be processed and the loops 24 and 24' have a time delay to provide a better motion indication. Further, the loops 24 and 24' can comprise a single loop that is time multiplexed between the high resolution and low resolution channels. Still further, the receiver can comprise two inverse DPCM loops processing the high and low resolution signals without the use of a buffer occupancy state signal.

What is claimed is:

1. Apparatus for transmitting a digital television picture signal comprising:

a buffer having a first output means for providing said digital television picture signal;

means for providing first data to said buffer representing a low resolution low pass filtered version of said picture; and means for providing second data to said buffer, only when said buffer can accept said second data without overflowing, said second data representing a high pass filtered high resolution version of said picture.

2. The apparatus of claim 1, wherein said buffer further comprises a second output means for providing a signal to said means for providing second data representing high, intermediate, and low occupancy states of said buffer.

3. The apparatus of claim 1, wherein said first output means also provides code words representing the occupancy state of said buffer.

4. The apparatus of claim 1, wherein said means for providing first data comprises a digitizer, a low pass filter coupled to said digitizer, and a subsampler coupled to said filter.

5. The apparatus of claim 1, wherein said means for providing second data comprises an interpolator coupled to said subsampler and a subtractor coupled to said digitizer and said interpolator.

6. The apparatus of claim 1, wherein said means for providing first data further provides a motion indicating signal to said means for providing second data.

7. The apparatus of claim 6, wherein said means for providing second data provides said high resolution version when said buffer occupancy is low and also when intermediate and no substantial motion is present, provides a unique code word when said occupancy is high, and provides zeroes when said occupancy is intermediate and substantial motion is present.

8. The apparatus of claim 1, wherein each of said means for providing comprises a differential pulse code modulation loop.

9. The apparatus of claim 8, wherein said loop of said means for providing first data comprises an adaptive loop.

10. The apparatus of claim 8, wherein said adaptive loop comprises a frame store and switch coupled thereto providing a one frame delayed predicted signal when there is no substantial motion and a one pixel delayed predicted signal when there is substantial motion.

11. The apparatus of claim 1, wherein each of said means for providing comprises an encoder coupled to said buffer.

12. The apparatus of claim 11, wherein each of said encoders comprises a Huffman and run-length encoder.

13. The apparatus of claim 11, wherein said second providing means encoder provides zeroes when said buffer occupancy is high.

14. Apparatus for receiving a digital television picture signal and a transmitter buffer occupancy state signal, said apparatus comprising:

a buffer having input means for receiving said signals, and a first output means for providing first data representing a low resolution low pass filtered version of said picture, and second output means for providing a high pass high resolution version of said picture, and a third output means providing the buffer state signal;

an adder;

means, coupled to said first output means and to said adder, for supplying said first data to said adder and a motion indicator signal;

means, coupled to said second and third output means, to said adder, and to said first supplying means, to receive said motion indicator signal and said buffer state signal and for supplying to said adder the second data when the transmitter buffer state signal is low and also when intermediate and no substantial motion is present.

15. The apparatus of claim 14, further comprising a digital to analog converter coupled to said adder.

16. The apparatus of claim 14, wherein each of said supplying means comprises an inverse differential pulse code modulation loop.

17. The apparatus of claim 16, wherein said first supplying means loop comprises an adaptive loop.

18. The apparatus of claim 17, wherein said adaptive loop comprises a frame store and a switch coupled thereto providing a one frame delayed predicted signal when there is no substantial motion and a one pixel delayed predicted signal when there is substantial motion.

19. Apparatus for receiving a digital television picture signal, said apparatus comprising:

a first inverse digital pulse code modulation loop for receiving first data representing a low resolution low pass filtered version of said picture;

a second inverse digital pulse code modulation loop for receiving second data representing a high resolution high pass filtered version of said picture; and an adder coupled to said loops.

20. The apparatus of claim 19, further comprising a digital to analog converter coupled to said adder.

21. The apparatus of claim 19, wherein said first loop comprises an adaptive loop.

22. The apparatus of claim 21, wherein said adaptive loop comprises a frame store and a switch coupled thereto providing a one frame delayed predicted signal when there is no substantial motion and a one pixel delayed predicted signal when there is substantial motion.

* * * * *